June 18, 1968 R. P. LUEDDEKE ET AL 3,388,816
DISC STACKING MACHINE ORGANIZATION
Filed July 20, 1966 2 Sheets-Sheet 1

INVENTORS
RAYMOND PAUL LUEDDEKE
LOUIS LUEDDEKE
BY
Davis, Hoxie, Faithfull & Hapgood
ATTORNEYS June 18, 1968     R. P. LUEDDEKE ET AL     3,388,816
DISC STACKING MACHINE ORGANIZATION Filed July 20, 1966     2 Sheets-Sheet 2

INVENTORS
RAYMOND PAUL LUEDDEKE
LOUIS LUEDDEKE
BY
ATTORNEYS

United States Patent Office 3,388,816
Patented June 18, 1968

3,388,816
DISC STACKING MACHINE ORGANIZATION
Raymond Paul Lueddeke and Louis Lueddeke, Scotch Plains, N.J., assignors to Eastern Target Company, Inc., Scotch Plains, N.J., a corporation of New Jersey
Filed July 20, 1966, Ser. No. 566,615
9 Claims. (Cl. 214—6)

This invention relates to machine organizations and, more specifically, to a manufacturing assembly for automatically and periodically stacking a desired number of disc-like structures.

In many manufacturing processes of commercial interest, a continuous sequence of disc structures must be arranged in stacked arrays of convenient groupings for counting, marking, packaging, or similar operations. For example, our co-filed application Ser. No. 566,614, discloses a machine for continuously fabricating disc-like clay target pigeons, often called "birds," which are utilized for trap or skeet shooting.

In the production of the above-described target elements, it has been found desirable to automatically stack the production output for packaging without employing manual labor. However, a machine organization for performing this function in a relatively simple, rapid and inexpensive manner has heretofore been unavailable.

It is therefore an object of the present invention to provide a machine organization which is useful in the production and packaging of disc structures.

More specifically, an object of the present invention is the provision of an arrangement for automatically organizing a continuous production run of disc elements into convenient stacked arrays.

Another object of the present invention is the provision of a clay pigeon stacking organization which is relatively simple and inexpensive, and which reliably operates at a relatively rapid cyclic rate.

The above and other objects of the present invention are realized specific, illustrative product disc stacking organization which includes a conveyor belt having a succession of product discs deposited thereon. Each disc is adapted in its translation to activate a microswitch and to separate two spring biased retaining fingers before coming to rest against two blocking obstructions in the conveyor plane.

The enabled switch energizes an air cylinder which, in turn, causes two horizontal members to lift the operand disc above the expanded fingers. Accordingly, the biased fingers project under the elevated disc thereby holding it in place until the next following operand element comes along to form the new bottom element of the stack.

When the final desired disc structure is inserted in the arrays, a second microswitch is disposed to activate a second air cylinder which lifts the conveyor belt above the plane of the retaining fingers. Accordingly, the entire stack of discs is then engaged by the moving belt and transported to the next processing station.

It is thus a feature of the present invention that a disc stacking machine organization include a conveyor belt, a mechanical stop for elements being transported by the belt, a pair of spring biased, disc separable retainer fingers disposed on either side of the belt, and structure responsive to the incidence of each operand disc for lifting the element above the plane of the retaining fingers.

It is another feature of the present invention that a disc stacking machine organization comprise a conveyor belt, a mechanical stop for elements being carried by the belt, a pair of spring biased, disc separable retainer fingers disposed on either side of the belt, structure responsive to the incidence of each operand disc for lifting the element above the plane of the retaining fingers, and components actuated by the incidence of a final desired disc in a vertical stack for lifting the conveyor belt above the plane of the retaining fingers.

A complete understanding of the present invention and of the above and other features and advantages thereof may be gained from a consideration of the following detailed description of an illustrative embodiment thereof presented hereinbelow in conjunction with the accompanying drawings, in which.

Figure 1:
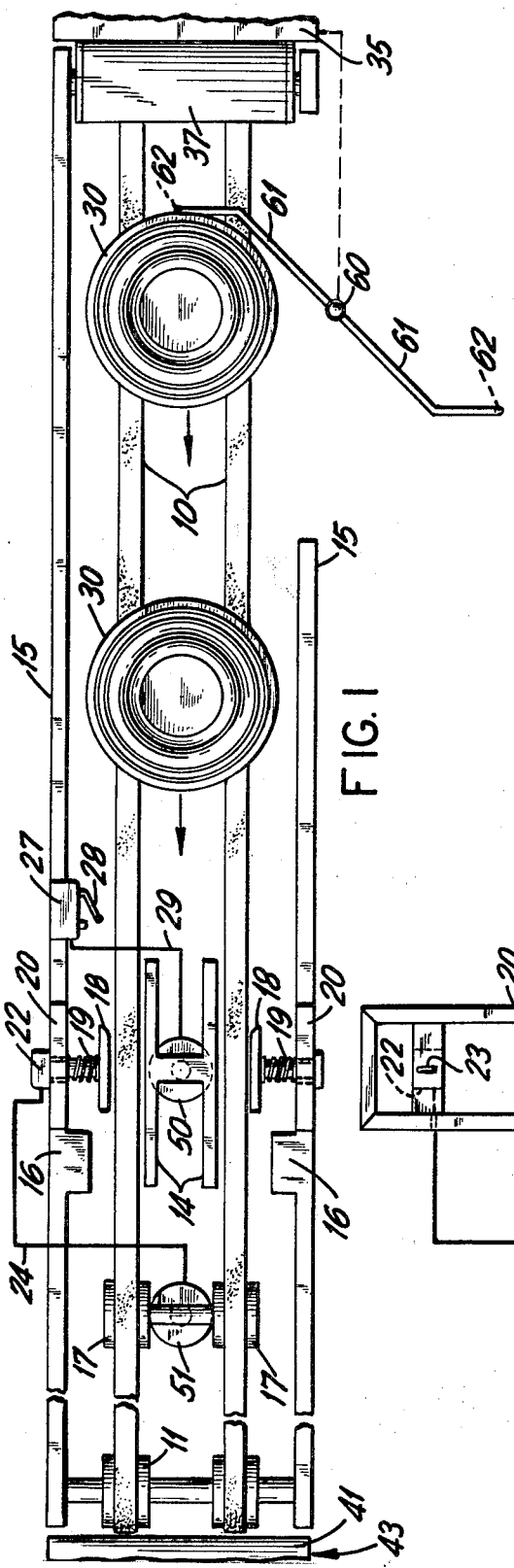
FIG. 1 is a top view of a disc stacking machine organization which embodies the principles of the present invention.
Figure 2:
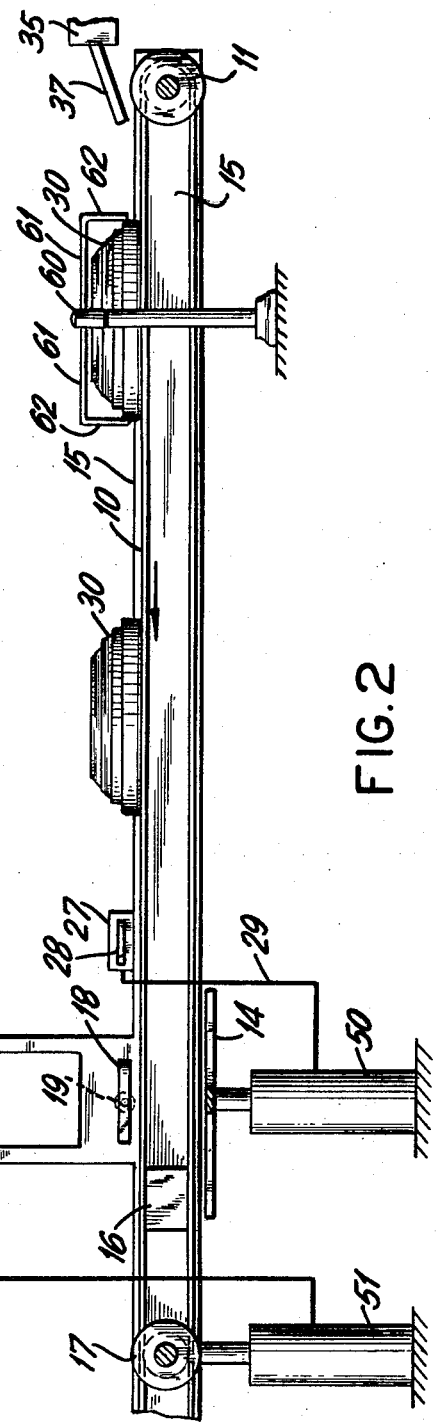
FIG. 2 is an interior side view of the organization depicted in FIG. 1.
Figure 4A:
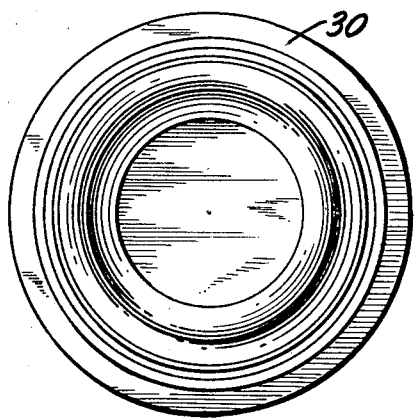
FIGS. 4A and 4B, respectively, comprise top and cross-sectional views of an illustrative operand disc processed by the organization in FIG. 1.
Figure 4B:
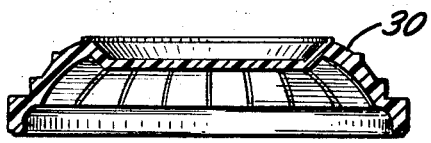

Referring now to FIGS. 1 and 2, there is shown in top and side view a machine organization for stacking a production run of successive operand discs 30 into convenient vertical arrays. The discs 30 may comprise, for example, clay pigeon targets of the type shown in FIGS. 4A and 4B.

The composite organization includes a two-strip conveyor belt 10 operable around and cylinders 11 for functionally transporting operand discs 30 supplied thereto via a target bird source 35 and a sliding ramp 37 in a right-to-left direction. Vertical frames 15 are disposed on either side of the belt 10, with each frame 15 including a blocking projection 16 therein to inhibit any translation of incident birds 30 therepast.

A channel 20 is mounted on each frame 15, with the periphery of the stacked discs 30 being disposed between the two columns 20. An I-shaped retainer finger 18 is adapted to pass through an aperture in each column 20, with two springs 19 imparting inward bias to the members 18.

A microswitch 27, having an actuating arm 28 thereon, is mounted on one frame 15 and responds to the passage of each operand bird 30 by activating an air cylinder 50 via lead 29. When so enabled, the cylinder 50 raises an H-shaped member which includes two arms 14, thereby vertically lifting a disc 30, which has been stopped by the frame projections 16, above the level of the retaining finger 18.

Similarly, a microswitch 22, having a compressible actuating member 23 thereon, is adapted to selectively enable an air cylinder 51 by way of a lead 24. The energized cylinder 51 is disposed to raise two axially-connected pulley wheels 17, and thereby also the conveyor belt strips 10 passing thereover, above the top of the fingers 18.

In addition, the belt 10 terminates at a successor processing station platform 43 (not shown in detail in the drawing) by way of connecting ramp 41. Finally, a portion of one side frame 15 is removed, and a shaft 60, having two horizontal arms 61 each terminated with a vertical member 62, is operable in synchronization with the disc source 35 to act through the vacant frame portion. The function affected by this last identified subassembly will be considered hereinafter.

To illustrate the operational sequencing of the instant machine organization, assume that a first clay pigeon target 30 to be included in a stack of interest is deposited on the belt 10 by the source 35 and ramp 37. Excluding the subassembly 60–62 which will be considered hereinbelow, the disc 30 first engages the switch arm 28, thereby actuating the switch 27, and then passes between the retaining fingers 18 which are thereby outwardly separated against the action of the springs 19. The target element 30 is subsequently stopped by the frame projections 16, with the fingers 18 being separated by a distance corresponding to the diameter of the target element 30.

The air cylinder 50 responds to an enabling signal supplied thereto by the activated switch 27 via the lead 29 by raising the members 14, hence lifting the bird above the fingers 18. Upon this occurrence, the fingers 18 are forced under the raised bird 30 by the action of the springs 19, thereby holding the bird 30 in place between the channels 20. The air cylinder 50 then returns the elements 14 to their quiescent level beneath the belt 10.

Figure 3:
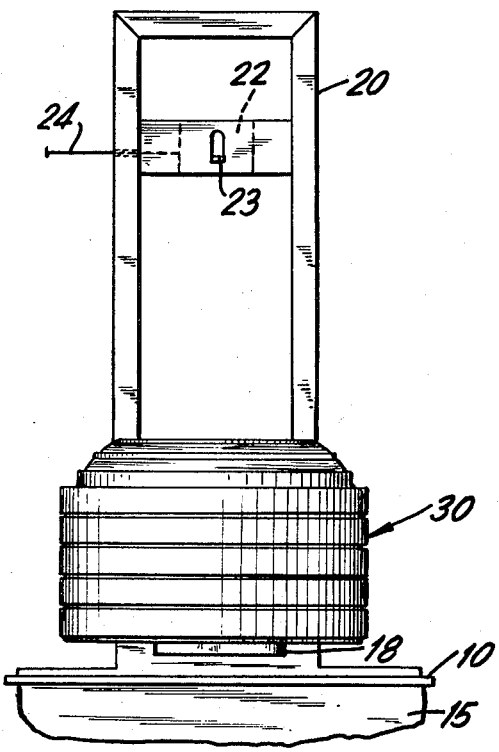
FIG. 3 illustrates the manner in which an intermediate size stack of operand discs are retained in the FIG. 1 arrangement.

The following encountered target discs 30 give rise to a mode of mechanical sequencing essentially identical to that described above, with each of these birds being adapted to pass under the previously stacked array and to form the new bottom member thereof when vertically raised by the elements 14 and retained in place by the fingers 18. The association between one channel 20 and a target array of intermediate size is shown in FIG. 3.

When the final target element 30 in an array has been thus positioned, the first encountered element 30 at the top of the stack actuates the switch 22 member 23 thereby energizing the air cylinder 51. In response thereto, the cylinder 51 raises the associated pulley wheels 17, and thereby also the belt elements 10 passing thereover, above the top of the fingers 18. The belt 10 is thereby adapted to engage the bottom-most disc 30 to transport the entire array past the channels 20 and the frame projections 16. Following this, the air cylinder 51 and the wheels 17 return to their initial position, and the conveyor belt 10 transports the stacked array of targets to the receiving platform 43 via the ramp 41.

The above considered organization has thus been shown by the above to be fully operative to cylically translate stacked disc arrays to the platform 43.

However, it has been found desirable to employ the vertical members 62 rotatably operable in synchronization with the source 35 under the action of the linking elements 60 and 61 and any conventional drive mechanism, to accurately space successive target discs 30 on the belt 10. This has the salutary effect of constraining the components in the FIG. 1 organization to operate at a regular cyclic rate, which is beneficial from a reliability standpoint.

It is to be understood that the above embodiment is only illustrative of the application of the principles of the present invention. Numerous other arrangements may be devised by those skilled in the art without departing from the spirit and scope thereof. For example, the microswitch 22 may be deleted and a counter arrangement utilized in conjunction with the output signals from the switch 27 to periodically actuate the air cylinder 51.

We claim:

1. In combination in a disc stacking machine organization, a conveyor belt, means for stopping discs transported by said belt, spring biased retaining finger means mounted adjacent to said belt and adapted to separate as the disc carried by said belt translate thereby, means mounted adjacent to said belt for detecting the incidence of each disc carried by said belt, and means activated by said detecting means for lifting a stopped disc above the level of said retaining finger means to be supported thereon.

2. A combination as in claim 1 further comprising means for detecting the incidence of each $n$th disc carried by said belt, where $n$ is any positive integer, and means selectively actuated by said $n$th disc detecting means for raising said conveyor belt above said retaining finger means.

3. A combination as in claim 2, wherein said means for detecting the incidence of each disc comprises a switch having a movable arm disposed in the path of the discs transported by said belt.

4. A combination as in claim 3, wherein said $n$th disc detecting means comprises a switch having a movable member disposed vertically above said retaining finger means.

5. A combination as in claim 4, wherein said stopped disc lifting means comprises an air cylinder and disc bearing means vertically translated by said air cylinder, and wherein said conveyor belt lifting means comprises an additional air cylinder and belt lifting means vertically translated by said additional air cylinder.

6. A combination as in claim 5, further comprising a source of clay pigeon target discs for sequentially depositing target discs on said conveyor belt.

7. A combination as in claim 2, wherein said stopped disc lifting means comprises an air cylinder and disc bearing means vertically translated by said air cylinder.

8. A combination as in claim 2, wherein said conveyor belt lifting means comprises an additional air cylinder and belt lifting means vertically translated by said additional air cylinder.

9. A combination as in claim 2, further comprising rotational means disposed above said belt for accurately spacing the discs carried by said belt.

References Cited

UNITED STATES PATENTS

| | | | |
|---|---|---|---|
| 1,632,203 | 6/1927 | Threefoot et al. | 214—6 X |
| 2,904,941 | 9/1959 | Midnight | 214—6 X |
| 3,038,615 | 6/1962 | Roth et al. | 214—6 X |

ROBERT G. SHERIDAN, *Primary Examiner.*

R. J. SPAR, *Assistant Examiner.*